United States Patent [19]
Maruyama et al.

[11] 4,166,899
[45] Sep. 4, 1979

[54] ISOLATION OF AROMATIC POLYESTER COPOLYMERS

[75] Inventors: Takashi Maruyama, Toyonaka; Katsuji Ueno, Hirakata, both of Japan

[73] Assignee: Sumitomo Chemical Company, Limited, Osaka, Japan

[21] Appl. No.: 747,060

[22] Filed: Dec. 3, 1976

[30] Foreign Application Priority Data

Dec. 5, 1975 [JP] Japan .................................. 50-145428

[51] Int. Cl.$^2$ ..................... C08G 63/18; C08G 63/70; C08G 63/72; C08G 63/74
[52] U.S. Cl. ..................................... 528/480; 528/194
[58] Field of Search ............... 260/47 C; 528/194, 480

[56] References Cited
U.S. PATENT DOCUMENTS

| 3,133,898 | 5/1964 | Keck | 260/47 |
| 3,351,624 | 11/1967 | Conix | 260/47 |
| 3,449,295 | 6/1969 | Conix | 260/47 |
| 3,933,713 | 1/1976 | Sokolov et al. | 260/29.2 E |
| 3,939,117 | 2/1976 | Ueno | 260/47 C |

Primary Examiner—Lester L. Lee
Attorney, Agent, or Firm—Birch, Stewart, Kolasch and Birch

[57] ABSTRACT

A method for the isolation of aromatic polyesters of a uniform and fine powder which comprises mixing a 1,2-dichloroethane solution containing 8 to 50% by weight of an aromatic polyester copolymer with 0.01 to 1.0 time by volume (based on said solution) of methanol, and isolating the resulting precipitates, said 1,2-dichloroethane solution containing an aromatic polyester copolymer being produced by contacting an aqueous alkaline solution of 2,2-bis(4'-hydroxyphenyl)propane with a 1,2-dichloroethane solution of a mixture of terephthaloyl chloride and isophthaloyl chloride.

6 Claims, No Drawings

ISOLATION OF AROMATIC POLYESTER COPOLYMERS

The present invention relates to a method for the isolation of aromatic polyester copolymers. More particularly, it relates to a method for isolating aromatic polyester copolymers in the form of a uniform and fine powder from the 1,2-dichloroethane (hereinafter, referred to as "EDC") solution of an aromatic polyester copolymer which is obtained by contacting an aqueous alkaline solution of 2,2-bis(4'-hydroxyphenyl)propane (hereinafter, referred to as "bisphenol A") with an EDC solution of a mixture of terephthaloyl chloride and isophthaloyl chloride.

The aromatic polyesters obtained by copolymerization of bisphenol A with a mixture of terephthalic acid and isophthalic acid or a mixture of the functional derivatives of both acids are very superior in heat resistance, flame resistance, transparency and mechanical properties. The well-known methods for the synthesis of the polymers are interfacial polymerization, solution polymerization, fusion polymerization and the like.

Among these methods, the interfacial polymerization is advantageous in that the synthesis of the aromatic polyesters is completed at room temperature and atmospheric pressure within a short period of time. By this polymerization method, the synthesis is satisfactorily carried out by merely mixing, with stirring, an aqueous alkaline solution of bisphenol A and a solution of a mixture of terephthaloyl chloride and isophthaloyl chloride in an organic solvent. When the stirring is stopped after completion of the reaction, the reaction mixture is separated into an aqueous layer containing substantially inorganic salts as by-products and an organic layer containing substantially the polymer.

The resulting polymer is isolated from the organic layer by the various well-known methods. For example, Japanese Patent Laid Open Publication (unexamined) No. 55,284/1973 discloses a method which comprises allowing the methylene chloride solution of aromatic polyester copolymers to stand and thereby forming the gels of the copolymers, followed by pulverizing.

In this method, the polymer content of the solution should be at least 40% by weight in order to complete the gelation within a few minutes. In the interfacial polymerization, in general, the polymer content after completion of the polymerization is about 10% by weight based on the organic solvent and therefore the solution should be concentrated for the gelation thereof. Efficient removal of the solvent from highly viscous polymer solutions requires a special apparatus such as a thin-film evaporator and the concentration of the polymer solutions results in increase of the manufacturing cost. Furthermore, the particle size of polymer powders thus obtained is coarse and only about 10 mesh at the smallest.

Another method is a method for precipitating the polymers by adding a non-solvent such as methanol or acetone to a solution of the polymers in an organic solvent. In this non-solvent method, the polymers can not be obtained in the form of a fine powder when a large amount of non-solvent is added at one time. Various improvements in this non-solvent method have been proposed. For example, Japanese Patent Laid Open Publication (unexamined) No. 14,598/1974 discloses a method which comprises adding a non-solvent to a polymer solution until a cloud point is reached, ageing the mixture and thereafter adding an additional amount of the non-solvent thereto. This method is, however, disadvantageous in that a relatively large amount of the non-solvent is required.

Besides, according to anyone of these well-known methods, it is impossible to remove the inorganic substances, which are produced as by-products during the polymerization reaction or are added at the beginning of polymerization, at the same time with precipitation of the polymers. Consequently, the solution of the polymers in an organic solvent is usually washed with water prior to the precipitation of the polymers. The washing can not, however, be performed efficiently, because it is carried out in an unhomogeneous system comprising an aqueous layer and an oily layer which are immiscible with each other. Therefore, removal of the inorganic substances is not sufficient even if the washing is repeated several times, and the physical properties of the polymers obtained are also unsatisfactory. Particularly, when the molded products of the polymers are exposed to steam or hot water, they lose transparency.

Moreover, in the foregoing washing treatment of the polymer solution, the whole system is sometimes emulsified, which makes the separation of the oil and water layers impossible. Thus, this method is not necessarily suitable for the industrial production of the polymers.

For the reasons as described above, the inventors extensively studied to find an improved method for the isolation of aromatic polyester copolymers having a low impurity content and excellent physical properties. By precipitating the copolymers with a small amount of a non-solvent in the form of a fine powder. As the results, it has been found that these objects can be accomplished by using EDC as a polymerization solvent for aromatic polyester copolymers and precipitating the copolymers with methanol as a non-solvent.

An object of the present invention is to provide a method for the production of aromatic polyester copolymers having good physical properties in the form of a fine powder.

Another object of the invention is to provide a method for isolating efficiently the aromatic polyester copolymers as a fine powder from the solution thereof.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects of the present invention can be accomplished by using EDC as the polymerization solvent and methanol as the non-solvent. In comparison of the present method, which comprises using EDC as the polymerization solvent and precipitating the polymers with methanol, with the prior art using methylene chloride as the polymerization solvent, it has been found that the present method is superior in the following points: the polymers can be precipitated at an extremely higher rate; a small amount of methanol is sufficient for the precipitation; and the polymers can be obtained in the form of a fine powder and have excellent physical properties.

The polymers of the present invention are particularly superior to those of the prior art in the following points: reduction in molecular weight is extremely low even in molding or in use at a high temperature and a high humidity; and transparency of the molded products is completely maintained even when the products are exposed to steam or dipped in hot water. It has also been found that the use of methanol as the non-solvent is important; a small amount of methanol is sufficient for the polymer-precipitation as compared with other non-solvents; and even if the washing treatment of the polymer solution prior to the polymer-precipitation is incomplete, removal of the inorganic impurities is attained at the same time with the polymer-precipitation and polymers having excellent physical properties are obtained.

In the present invention, the EDC solution containing 8 to 50% by weight of an aromatic polyester copolymer is produced by contacting an aqueous alkaline solution of bisphenol A with an EDC solution of a mixture of terephthaloyl chloride and isophthaloyl chloride at room temperature, usually with stirring, whereby the polymerization reaction proceeds. The production is carried out under the condition described in various literatures, for example, in Japanese Patent Laid Open Publication (unexamined) Nos. 51,094/1973 and 51,095/1973 and British Pat. No. 897,640, except that EDC is used as the solvent for the mixture of terephthaloyl chloride and isophthaloyl chloride.

That is, the bisphenol A is used as a solution in water containing an alkali metal hydroxide (e.g. sodium hydroxide, potassium hydroxide, etc.). The concentration of bisphenol A in the aqueous alkaline solution is not specifically limited, but is preferably in the range of 5 to 25% by weight. The alkali may be usually used in an equivalent amount to that of bisphenol A, but may also be used in a larger amount. The preparation of the alkaline solution of bisphenol A may be preferably done at an atmosphere excluding oxygen as possible.

The conentration of the EDC solution of the mixture of terephthaloyl chloride and isophthaloyl chloride is not specifically limited, but is usually in the range of 5 to 25% by weight. The ratio of the terephthaloyl chloride and isophthaloyl chloride in the mixture is preferably in the range of 1:10 to 10:1 by mol.

In the process for producing the aromatic polyester copolymers, the contact of the aqueous alkaline solution of bisphenol A with the EDC solution of a mixture of terephthaloyl chloride and isophthaloyl chloride may be carried out by adding the EDC solution to the aqueous alkaline solution or by the reverse way. Alternatively, both solutions may be added at the same time. In any case, the mixture should be vigorously stirred in order to disperse them homogeneously. The volume ratio of the EDC solution to the alkaline solution is preperably in the range of 1:1 to 1:3.

A part of the bisphenol A used in the present invention may be replaced by a halogen-substituted bisphenol A (e.g. 2,2-bis(4-hydroxy-3,5-dibromophenyl)propane) or a bisphenol A substituted with an alkyl on the nucleus (e.g. 2,2-bis(4-hydroxy-3,5-dimethylphenyl)propane). The bisphenol A and the mixture of terephthaloyl chloride and isophthaloyl chloride may be preferably used in a stoichiometric molar ratio, but the molar ratio is not strictly restricted. The molecular weight of the produced aromatic polyester copolymer may be somewhat regulated with the molar ratio of the bisphenol A and the mixture of terephthaloyl chloride and isphthaloyl chloride, but there may be used a conventional molecular weight regulator, such as a monovalent phenol or a monovalent aromatic carboxylic acid cloride. Besides, for promoting the polymerization speed, there may be also used a conventional catalyst or a dispersing agent. Suitable example of the catalyst are a quaternary ammonium salt, a quaternary arsonium salt, a quaternary phosphonium salt, a teritary amine, or the like, which may usually be used in an amount of 0.001 to 5% by weight based on bisphenol A.

The reaction mixture obtained after completion of the polymerization is in the state wherein water forms an emulsion phase in the EDC solution. In the present invention, the reaction mixture is separated into an aqueous layer and an EDC solution layer by allowing it to stand. The separated EDC layer is subjected, as it is or after breaking the aqueous emulsion phase in the EDC layer, to the usual washing treatment and then to the isolation treatment.

In preferred embodiment of the present invention, the amount of water contained in the EDC layer as an emulsion phase is controlled within less than 50% by weight and the EDC layer is washed with methanol or a methanol-containing acidic, neutral or alkaline aqueous solution. That is, when the stirring is stopped after completion of the polymerization, the reaction mixture is separated into an aqueous layer containing substantially inorganic salts and the EDC layer containing substantially the produced polymer. The EDC layer contains emulsified water which is not separable even on standing. When a large amount of the emulsified water is present in the EDC layer, it is necessary to repeat the subsequent washing of the EDC layer many times in order to assure complete removal of the inorganic substances contained in the emulsified water. For eliminating this defect, the amount of the emulsified water in the EDC layer is limited to less than 50% by weight based on EDC and the EDC layer is washed with methanol or a methanol-containing acidic, neutral or alkaline aqueous solution, by which the washing is carried out efficiently. The methanol-containing acidic, neutral or alkaline aqueous solution may be a mixture of methanol and water, which optionally contains an inorganic or organic acid (e.g. hydrochloric acid, sulfuric acid, phosphoric acid, acetic acid, etc.) or an inorganic base (e.g. sodium hydroxide, potassium hydroxide, etc.).

The amount of emulsified water in the EDC layer depends upon the polymerization conditions, for example, the purity of the monomers, polymerization temperature, polymerization time, number of revolution, kind and amount of catalyst, ratio of the aqueous alkaline solution of bisphenol A to the EDC solution of the acid chlorides, viscosity of the resulting polymer solution and the like. Consequently, the polymerizaion conditions should properly be selected but they can easily be determined.

The methanol or the methanol-containing aqueous solution used as the washing liquid in the above preferred embodiment is preferably used in an a amount of 0.05 to 3 times by weight, more preferably 0.1 to 2 times by weight, based on the weight of EDC. When the amount of the methanol or the methanol-containing aqueous solution is less than 0.05 time by weight, the washing is insufficient, and on the other hand, when it is over 3 times by weight, it is not suitable from the economical viewpoint.

Besides, the amount of methanol is preferably in the range of 5 to 95% by weight based on the total weight of the water content in the EDC layer before washing and the amount of the washing liquid. When the amount of methanol is less than 5% by weight, the washing is insufficient, and on the other hand, when it is over 95% by weight, the polymer is unfavorably precipitated.

The methanol-containing acidic aqueous solution is the most preferred washing liquid, because the emulsified water can easily be de-emulsified and the washing can be completed only by one washing treatment. Particularly, preferred methanol-containing acidic aqueous solution is the solution containing the acid as mentioned hereinbefore in an amount equivalent or more to the amount of the alkali contained in the EDC layer. When the amount of water contained in the EDC layer after washing is less, the polymer can be precipitated within a shorter time, and therefore, it is preferable to reduce the amount of water contained in the EDC layer after washing as small as possible, e.g. less than 3% by weight based on EDC. From this standpoint, the washing method mentioned above is preferable.

In the present invention, the EDC solution of aromatic polyester copolymer thus obtained is mixed, with stirring, with methanol of 0.01 to 1.0 time by volume based on the EDC solution to make a homogeneous transparent solution or a white turbid solution. The resulting solution is allowed to stand at −30° to 80° C., preferably −5° to 60° C., for a few minutes to several hours, whereby the resulting aromatic polyester copolymer is precipitated. The precipitated copolymer can be isolated by filtration in the form of a uniform and fine powder. The copolymer thus obtained has a smaller content of inorganic or organic impurities. Particularly, when the molded product containing a large amount of sodium is exposed to steam or hot water, it loses transparency. For eliminating this defect, it is required to reduce the sodium content in the polymer to less than 100 ppm, more preferably less than 50 ppm. For this purpose, the present invention is suitable, and the sodium content can be easily reduced by a simple operation.

When the amount of methanol to be added is less than 0.01 time by volume, the copolymer is hardly precipitated. While, when the amount is more than 1.0 time by volume, the copolymer is hardly obtainable in the form of a uniform and fine powder. Concentration of the EDC solution of aromatic polyester copolymer is not particularly required, but when the polymer content of the EDC solution is increased by concentration, it serves to reduce the amount of methanol to be added.

The particle size of precipitated polymer depends upon the polymer content of the EDC solution, amount of methanol, temperature at which methanol is added and temperature at which the EDC solution is allowed to stand. However, the copolymers can easily be obtained as a uniform and fine powder by the proper selection of the above-described conditions.

The aromatic polyester copolymers thus obtained have a particle size of 200 to 300 mesh and the particle size is more fine and uniform than that of the copolymers isolated by the well-known methods. In addition, the copolymers thus obtained have a relatively large apparent specific gravity. Consequently, they are superior as a powder for powder molding or coating.

The polymer-isolation method of the present invention is superior to the well-known methods in the following points: the polymer is precipitated in a high rate; a small amount of non-solvent is sufficient for the precipitation; and a uniform and fine powder can be obtained without sieving. Besides, the polymers obtained by the present method are superior to those obtained by the well-known methods in the following points: the contents of inorganic and organic impurities are low; the reduction of molecular weight in molding or in use at a high temperature and a high humidity is low; and the molded products of the polymer do not lose transparency even when exposed to steam or hot water. Particularly, the present method is characterized in that the polymers obtained by the present method are superior to those obtained by the well-known methods in their physical properties even if the washing of polymer solutions prior to precipitation of the polymers is insufficient to some degree.

The present invention will be illustrated with reference to the following examples. These examples are only given for the purpose of illustration and are not intended to limit the invention.

EXAMPLE 1

In a 500 ml separable flask equipped with an anchor type stirrer, bisphenol A (11.4 g), sodium hydroxide (4.2 g), o-phenylphenol (0.154 g) and trimethylbenzylammonium chloride (0.05 g) were dissolved in water (240 ml). To the resulting solution was added a solution of terephthaloyl chloride (5.075 g) and isophthaloyl chloride (5.075 g) in EDC (120 ml) with a vigorous stirring within a few minutes. The resulting mixture was continuously stirred at 20° C. for 2 hours and then stirring was stopped to allow the reaction mixture to separate into an aqueous layer and an EDC layer. The water content of the EDC layer was 38% by weight.

The EDC layer was mixed with water (240 ml) and washed with a vigorous stirring. After removal of the aqueous layer, the EDC layer was washed with a mixture of conc. hydrochloric acid (1 ml) and water (240 ml). Thereafter, the EDC layer was washed repeatedly with water (240 ml) until the aqueous layer became neutral. The EDC solution thus obtained was mixed with methanol (30 ml) with stirring and continuously stirred for 30 minutes. Thus, the polymer was precipitated as fine particles. The precipitated polymer was filtered and dried to obtained a white fine powder (17.2 g).

The fine powder obtained had a bulk specific gravity of 0.58 g/ml and the following particle size distribution.

| Particle size | Weight percentage |
|---|---|
| Less than 200 mesh | 0 |
| 200–250 mesh | 45 |
| 250–300 mesh | 55 |
| More than 300 mesh | 0 |

Reference Example 1

The polymerization was carried out in the same manner as in Example 1 except that methylene chloride was used in place of EDC. Thus, the methylene chloride solution of polymer was obtained.

In the same manner as in Example 1, methanol (30 ml) was added to the solution and the mixture was allowed to stand for 30 minutes, but the polymer was not isolated.

EXAMPLE 2

The polymerization and the subsequent washing were carried out in the same manner as in Example 1 to obtain the EDC solution of polymer. The polymer solution thus obtained was concentrated until the polymer content become 30% by weight.

The polymer solution was then uniformly mixed with methanol (3 ml) at room temperature with a poweful stirring. After the addition of methanol, the solution was transparent. When the transparent solution was allowed to stand for 10 minutes at room temperature, the polymer was precipitated as fine particles, which were filtered and dried to give a polymer having a bulk specific gravity of 0.59 g/ml and the following particle size distribution.

| Particle size | Weight percentage |
| --- | --- |
| Less than 200 mesh | 0 |
| 200-250 mesh | 48 |
| 250-300 mesh | 52 |
| More than 300 mesh | 0 |

Reference Example 2

The procedure was carried out in the same manner as in Example 1, except that methylene chloride was used in place of EDC. Thus, the methylene chloride solution of polymer was obtained.

Thereafter, methanol (90 ml) was gradually added to the solution with stirring and the mixture was continuously stirred for 8 hours, and then the polymer began to solidify. The polymer particles obtained were pearl-like and had a very coarse particle size.

Reference Example 3

The polymerization and the subsequent washing were carried out in the same manner as in Example 1 to obtain the EDC solution of polymer. After acetone (40 ml) was added thereto with stirring, the mixture was continuously stirred for 30 minutes to obtain fine particles. The precipitated polymer particles were filtered and dried.

The polymers obtained in Example 1, Reference Example 2 and Reference Example 3, respectively, were tested for the sodium content of polymer, thermal stability and loss of transparency by steam treatment. The results are as shown in the following table.

| | Sodium content (ppm) | Thermal stability*1 | Loss of transparency by steam treatment*2 |
| --- | --- | --- | --- |
| Example 1 | 8 | 100% | o |
| Reference Example 2 | 150 | 83% | x |
| Reference Example 3 | 100 | 95% | x |

[Remark]:
*1This is shown by the retention rate of molecular weight when the polymer was pressed at 330° C. for 20 minutes.
*2This is shown by the change of appearance when the polymer was treated with steam at 150° C. for 20 minutes, which was evaluated as follows:
o: No change (test sample remains transparent)
x: Loss of transparency (test sample becomes opaque)

it is apparent from the above results that the polymer obtained by the present invention has a low content of inorganic substances and excellent physical properties.

EXAMPLE 3

The polymerization was carried out in the same manner as in Example 1. After completion of the polymerization, stirring was stopped and the reaction mixture was allowed to stand. Then, the mixture separated into two layers. The aqueous layer was removed. The EDC was tested for water content by gas chromatography. The water content was 38% by weight based on EDC. The EDC layer was mixed with methanol (100 ml) and conc. hydrochloric acid (0.5 ml) with a vigorous stirring. After 30 minutes, stirring was stopped and the upper layer was removed. The lower EDC layer thus obtained contained 1.2% by weight of water. The lower EDC layer was mixed with methanol (20 ml) and the mixture was continuously stirred for 30 minutes, fine particles were precipitated. The precipitated polymer was filtered and dried to obtain a white fine powder. The polymer thus obtained had a sodium content of 6 ppm and showed a thermal stability of 100% when tested in the same manner as in Reference Example 3. Further, the polymer showed no loss of transparency when treated with steam.

Reference Example 4

For illustrating the influence of the water content in the EDC layer after washing, the following test was done.

To the EDC layer obtained after washing in Example 3 was added water (10 ml). After stirring, the mixture was mixed with methanol (30 ml) in the same manner as in Example 3. Although the mixture was stirred for 30 minutes, the polymer was not precipitated. Even by stirring for additional 5 hours, no polymer was still precipitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the production of aromatic polyesters of a uniform and fine powder, which comprises:

mixing an aqueous alkaline solution of 2,2-bis(4'-hydroxyphenyl) propane with a 1,2-dichloroethane solution of a mixture of terephthaloyl chloride and isophthaloyl chloride with stirring to obtain a mixture containing an aromatic polyester copolymer;

subjecting the mixture to liquid-liquid phase separation;

washing the thus separated 1,2-dichloroethane solution containing the aromatic polyester copolymer using methanol or a methanol-containing aqueous solution as a washing liquid, said separated 1,2-dichloroethane solution having a water content of less than 50% by weight based on 1,2-dichloroethane, the amount of methanol being in the range of 5 to 95% by weight based on the total amount of said washing liquid and water contained in the separated 1,2-dichloroethane solution before washing;

mixing the 1,2-dichloroethane solution thus washed with 0.01 to 1.0 time by volume, based on said solution, of methanol, said 1,2-dichloroethane solution containing 8 to 50% by weight of the aromatic polyester copolymer; and isolating the resulting precipitates.

2. A method according to claim 1, wherein the amount of said washing liquid is in the range of from 0.05 to 3 times by weight based on 1,2-dichloroethane in said copolymer solution before washing.

3. A method according to claim 2, wherein the amount of said washing liquid is in the range of from 0.1 to 2 times by weight.

4. A method according to claim 1, wherein said 1,2-dichloroethane solution after washing has a water content of less than 3% by weight based on 1,2-dichloroethane.

5. An aromatic polyester copolymer obtained according to the method as set forth in claim 1.

6. An aromatic polyester copolymer according to claim 5, wherein said aromatic polyester copolymer has a sodium content of less than 100 ppm.

* * * * *